Figure 3:
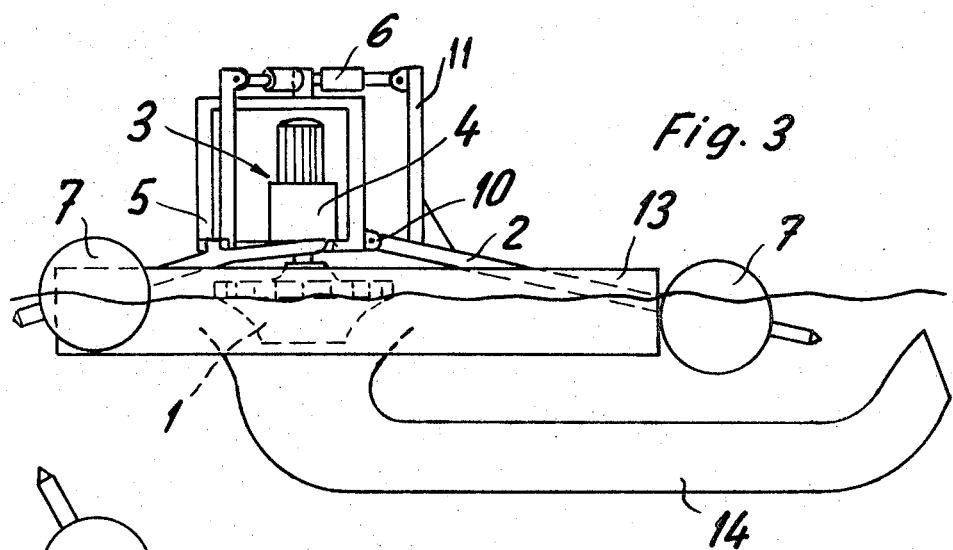

United States Patent [19]
Kaelin

[11] 3,811,662
[45] May 21, 1974

[54] AERATION DEVICE FOR THE SURFACE AERATION OF LIQUIDS

[76] Inventor: Joseph Richard Kaelin, Villa Seeburg, CH-6374-Buochs, Switzerland

[22] Filed: Sept. 5, 1972

[21] Appl. No.: 286,206

[30] Foreign Application Priority Data
Sept. 6, 1971  Switzerland.................... 13012/71

[52] U.S. Cl.............................. 261/91, 261/120
[51] Int. Cl.............................................. B01f 3/04
[58] Field of Search............................ 261/91, 120; 74/521–525; 52/149–151; 248/26

[56] References Cited
UNITED STATES PATENTS
3,246,882   4/1966   Clough.......................... 261/91 X
3,462,132   8/1969   Kaelin............................. 261/91 X
3,595,537   7/1971   Kaelin................................ 261/91
3,620,512   11/1971  Muskat et al................... 261/120 X
3,709,470   1/1973   Auler et al......................... 261/91

FOREIGN PATENTS OR APPLICATIONS
461,385   10/1968   Switzerland........................ 261/91

Primary Examiner—Tim R. Miles
Assistant Examiner—Richard L. Chiesa
Attorney, Agent, or Firm—Pierce, Scheffler & Parker

[57] ABSTRACT

The aeration device of the invention has supporting legs which, in the rotor-bearing unit end, are forked and are hinged to a cage-like supporting frame which surrounds the rotor-bearing unit, whereby the height of the latter can be adjusted by adjusting means provided on or adjacent the axis of the supporting legs.

19 Claims, 6 Drawing Figures

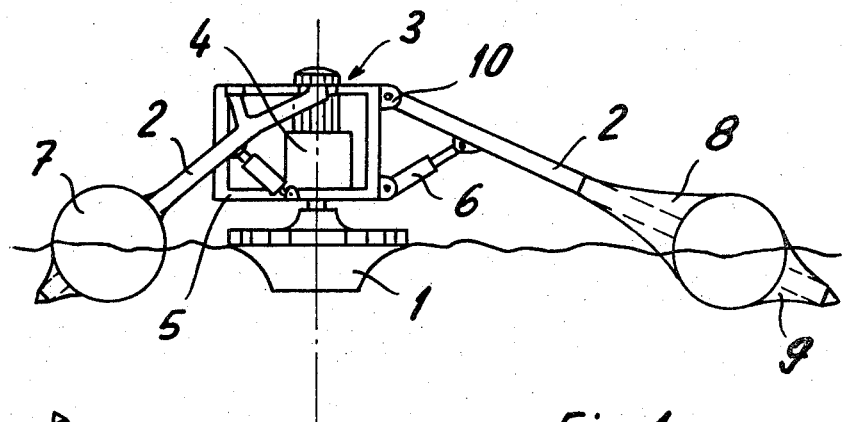
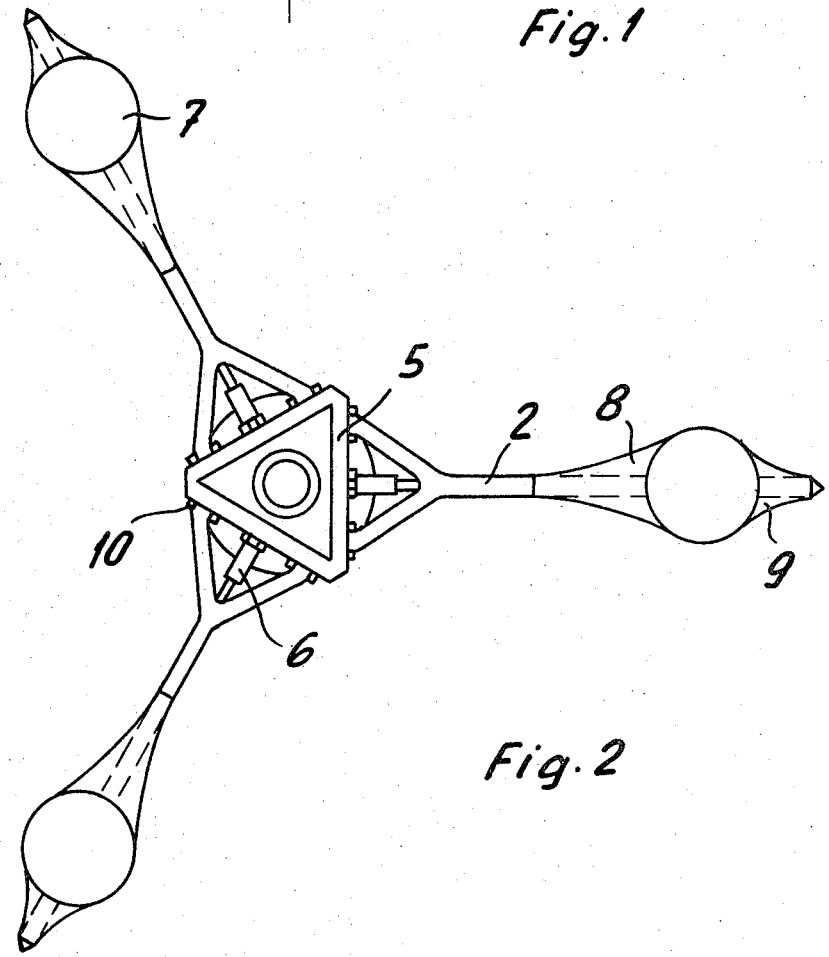

AERATION DEVICE FOR THE SURFACE AERATION OF LIQUIDS

The invention concerns an aeration device for the surface aeration of liquids, water in particular, with a supporting structure for the surface aeration rotor provided with supporting legs underneath to support the rotor bearing and a driving unit.

Height adjustments for surface aeration rotors are already known in which the driving shaft for the latter is displaced along its length. These height adjustments have the disadvantage, however, that they are relatively costly and only permit movement of the aeration rotor in the longitudinal direction of the axis of rotation. Particularly with floating aeration devices it is often found that the rotor drive shaft does not run vertically to the water surface for various reasons, resulting in the aeration rotor leaving the optimum working position and, in addition, producing undesirable lateral forces on the bearing of the rotor drive shaft.

The purpose of the present invention is to produce an aeration device without the above disadvantages.

The aeration device invented is distinguished in having its supporting legs at the rotor bearing unit end in fork-form and hinged to a cage-like supporting frame surrounding the rotor bearing unit for height adjustment, and that on the supporting legs as well as above or below the swivel axis of the latter on the supporting frame, adjusting means are provided to alter the position of the supporting legs relative to the rotor bearing unit.

It is advantageous for many purposes that the supporting legs are provided with floats to float the supporting structure on the surface of the liquid.

To prevent the floats icing up during the cold period of the year, it is desirable for these to be heated and that the heating is thermostatically controlled.

To prevent the supporting legs rusting, it is best to coat them with a layer of plastic.

To damp out undesired oscillations it is necessary that the supporting legs are connected directly or indirectly with the rotor bearing unit via oscillation-damping elements.

To achieve zonal aeration in public waters it is desirable if the aeration rotor is surrounded by a boundary wall dipping in the liquid for guidance of the liquid fed in a given direction to a lateral outlet. It is then preferable for the inlet of the aeration rotor to be connected to the area of the liquid surface outside the boundary wall and in the opposite direction to its outlet via a suction pipe.

The invention is described below with reference to the drawings. These show:

FIG. 1 A side-view of an initially proposed design of an aeration device invention;

FIG. 2 A plan of the aeration device shown in FIG. 1

FIG. 3 A side-view of a second version of an aeration device invention

Figure 4:
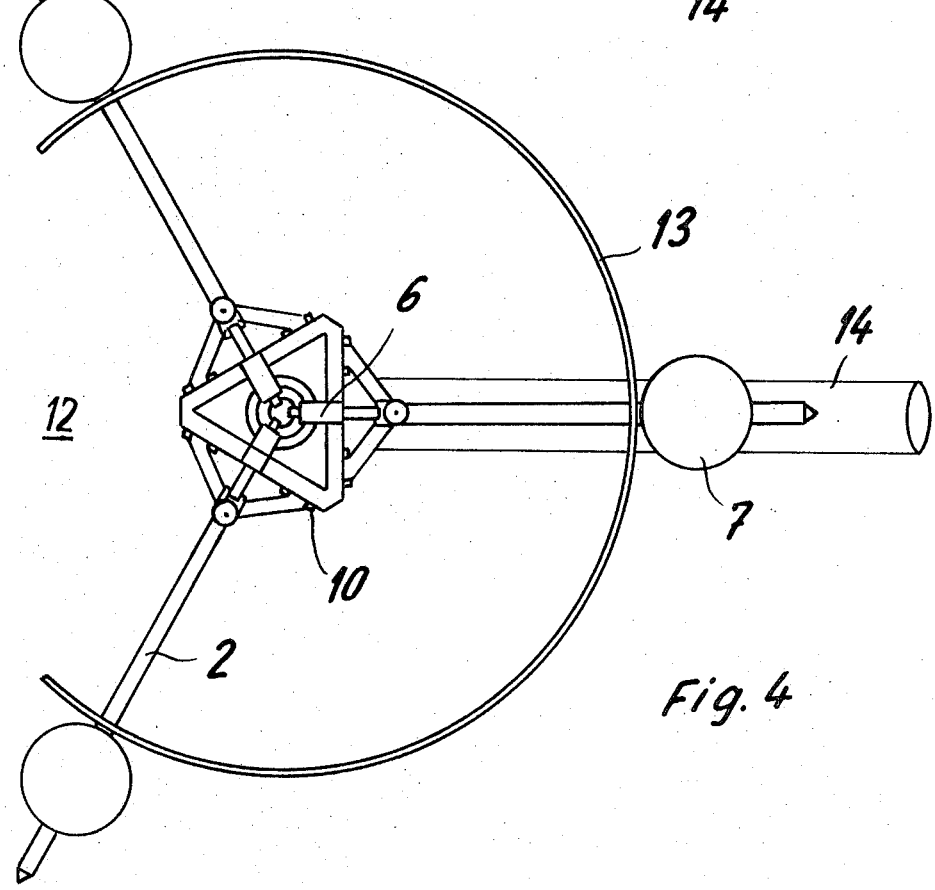

FIG. 4 A plan of the aeration device shown in FIG. 3

Figure 5:
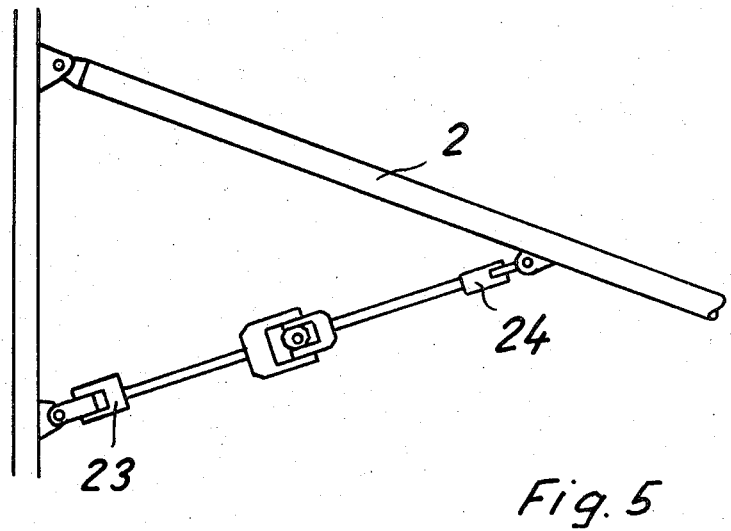
Figure 6:
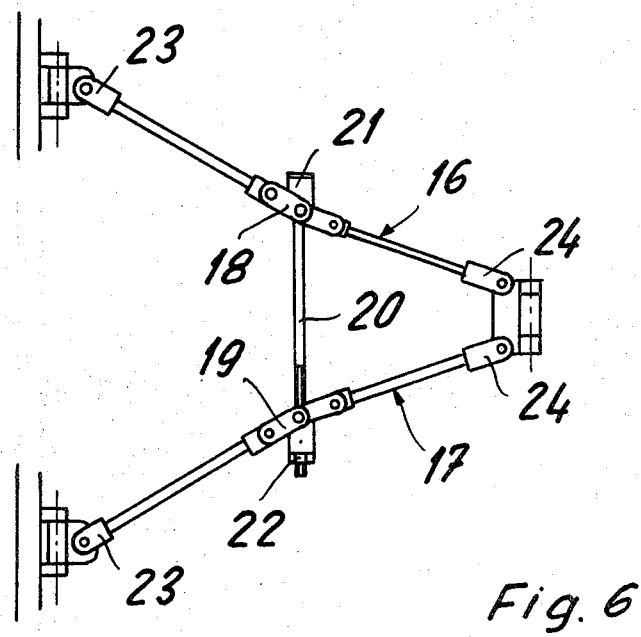

FIGS. 5 and 6 A different design of the means of adjustment for the aeration device shown in FIGS. 1 and 2.

The aeration device shown in FIGS. 1 and 2 for the surface aeration of water is provided with a supporting structure designed for the surface aeration rotor 1, with supporting legs 2 underneath to support the rotor bearing and drive unit 3.

To achieve an accurate alignment of the aeration rotor 1 on the water surface, i.e., both with respect to the rotor immersion depth and also to the horizontal position, the supporting legs 2 are hinged with the supporting frame 5 holding the rotor bearing unit 4. To alter the position of the supporting legs 2 with respect to the rotor bearing unit 4 hydraulic or mechanical means of adjustment are fitted between the individual supporting legs 2 and the supporting frame. These adjusters 6 can be formed, for example, by a spindle driven by an electric motor and an associated nut section or by a hydraulic cylinder.

The supporting legs 2 are each provided with a float 7 at the end to enable the supporting structure to float on a water surface. For coarse adjustment of the position of the aeration rotor 1 in the vertical direction, floats 7 can be moved along the supporting legs 2 so that when mounting the aeration device the height of the aeration rotor 1 can be roughly set to a given value.

To achieve minimum obstruction to the surface flow produced by aeration rotor 1 it is best for floats 7 to possess a suitable profile with respect to the liquid flow produced by rotor 1. For this purpose, suitably shaped housing elements 8 and 9 are fitted on each side of the ball-shaped floats 7, which can be heated in winter so that the flow profile is not disturbed by attached ice. Heating is best thermostatically controlled. The floats 7 comprise hollow spheres made of polyester which are filled with polyurethane foam, for example, to prevent sinking of the aeration device by wilful damage to the floats 7.

To prevent rust forming on the supporting legs 2 and the adjusters 6, they are covered with a layer of plastic. Naturally, the remaining parts less subjects to rusting can also be covered with plastic.

To achieve as rigid a supporting structure as possible, the supporting legs 2 as seen in FIG. 2 are fork-shaped at the rotor bearing unit end 4.

To attenuate any oscillations produced by aeration rotor 1 the supporting legs 2 are connected to the supporting frame 5 via oscillation-damping elements fitted in the swivels 10.

With the design shown in FIGS. 1 and 2 it is easily possible to set aeration rotor 1 always exactly in the optimum working position.

Naturally, the same adjustment setting can also be used when the supporting legs 2 are not provided with floats 7 and are set, for example, directly on the bed of a lake.

FIGS. 3 and 4 show a second version of an aeration device invention designed for aerating specific zones of water.

In comparison with the design shown in FIGS. 1 and 2, the same or similar parts are given the same reference.

To obtain a more powerful better running lever arm for the swivelling of supporting legs 2, the latter are provided here with lever arms 11 rigidly attached, each of which is contacted by an adjuster 6.

For aeration of specific zones of water the aeration rotor 1 as in FIG. 4 is surrounded by a boundary wall 13 dipping into the water of annular section, to feed the water it delivers in a definite direction to an outlet 12.

In order to remove water from a few dirty places the inlet of the aeration rotor 1 as seen in FIG. 3 is connected with the water surface area outside the boundary wall 13 and in the opposite direction to its outlet 12 via a suction pipe 14.

FIGS. 5 and 6 show another version of the adjuster of an aeration device shown in FIGS. 1 and 2 for fixing to the supporting legs 2.

This means of adjustment has two approximately V-shaped converging hinged rods 16 and 17 which are connected via a spindle 20 between their ends at joints 18 and 19. Spindle 20 is connected at one end via sprung elements 21 to joint 18 and to joint 19 at the other end via an adjusting nut 22. By adjusting nut 22 the spacing between joints 18 and 19 is altered and therefore also the distance between the ends 23 and 24 of the hinged bars 16 and 17, i.e., the immersion depth or position of rotor 1. If it is ensured when designing the adjuster that the hinged bars 16 and 17 are not fully extended in the working position, then there is a sprung support of supporting legs 2 via the sprung elements 21.

It is naturally also possible to adjust the joints 18 and 19 hydraulically or with the aid of an electric motor.

I claim:

1. Aeration device for the surface aeration of liquids, particularly water, with a supporting structure for the surface aeration rotor provided with supporting legs underneath to support the rotor bearing and drive unit, characterized in that the supporting legs are forked at the rotor bearing unit end and are hinged with a cage-like supporting frame surrounding the rotor bearing unit for height adjustment, and that adjusters to alter the position of the supporting legs with respect to the rotor bearing unit are provided on the supporting legs as well as above or below the axis of rotation of the latter on the supporting frame.

2. Aeration device according to claim 1, characterized in that the supporting legs are provided with floats to enable the supporting structure to float on the surface of a liquid.

3. Aeration device according to claim 2, characterized in that the floats are adjustably mounted along the supporting legs.

4. Aeration device according to claim 2, characterized in that the floats and/or flow casings joined to them can be heated.

5. Aeration device according to claim 4, characterized in that the heating of the floats and/or the flow casings is thermostatically controlled.

6. Aeration device according to claim 2, characterized in that the floats have a profile suitable for liquid flow relative to the flow produced by rotor.

7. Aeration device according to claim 2, characterized in that the floats are made from plastic, in particular polyester, and are preferably hollow.

8. Aeration device according to claim 7, characterized in that the hollow form floats are filled at least partly with a foamed plastic, for example polyurethane foam.

9. Aeration device according to claim 1, characterized in that the supporting legs are covered with a layer of plastic.

10. Aeration device according to claim 1, characterized in that the adjusters are covered on the outer side with a layer of plastic.

11. Aeration device according to claim 1, characterized in that the supporting legs are directly or indirectly connected to the supporting frame via oscillation-damping elements.

12. Aeration device according to claim 1, characterized in that the adjusters have a spindle and an associated nut section.

13. Aeration device according to claim 1, characterized in that the adjusters are formed by at least one hydraulic cylinder.

14. Aeration device according to claim 1, characterized in that the aeration rotor is surrounded by a boundary wall dipping in the liquid and having a lateral outlet to feed the liquid delivered in a given direction.

15. Aeration device according to claim 14, characterized in that the plan of the boundary wall is of annular form.

16. Aeration device according to claim 14, characterized in that the inlet of the aeration rotor is connected to the liquid surface area outside the boundary wall and in the opposite direction to its outlet via a suction pipe.

17. Aeration device according to claim 1, characterized in that the adjusters have at least two approximately V-shaped converging connecting elements connected between their ends to an adjusting member so that with the aid of the latter the mutual separation between the connecting elements can be altered over at least a part of their length.

18. Aeration device according to claim 17, characterized in that the connecting elements consist of two hinged rods.

19. Aeration device for the surface aeration of liquids, particularly water, with a supporting structure for the surface aeration rotor provided with supporting legs underneath to support the rotor bearing and drive unit, characterized in that the supporting legs are forked at the rotor bearing unit end and are hinged with a cage-like supporting frame surrounding the rotor bearing unit for height adjustment, and that adjusters to alter the position of the supporting legs with respect to the rotor bearing unit are provided on the supporting legs as well as above or below the axis of rotation of the latter on the supporting frame, and that the aeration rotor is surrounded by a boundary wall dipping in the liquid and having a lateral outlet to feed the liquid delivered in a given direction.

* * * * *